United States Patent [19]
Wittman

[11] Patent Number: 5,375,708
[45] Date of Patent: Dec. 27, 1994

[54] REUSABLE HARD CLEAR PACKAGE FOR VIDEO GAMES

[75] Inventor: Boyd Wittman, Colorado Springs, Colo.

[73] Assignee: Empak, Inc., Chanhassen, Minn.

[21] Appl. No.: 232,370

[22] Filed: Apr. 25, 1994

[51] Int. Cl.$^5$ ............................................. B65D 55/02
[52] U.S. Cl. .................... 206/315.1; 206/1.5; 292/91; 292/6
[58] Field of Search ............... 70/345, 346, 57.1; 292/80, 91, 6, 10; 206/1.5, 387, 444, 315.1

[56] References Cited

U.S. PATENT DOCUMENTS

| | | |
|---|---|---|
| 3,825,143 | 7/1974 | Julian ............................. 206/1.5 X |
| 3,828,922 | 8/1974 | Holkestad . |
| 3,933,240 | 1/1976 | Humble . |
| 4,047,410 | 9/1977 | Close . |
| 4,285,429 | 8/1981 | MacTavish . |
| 4,589,549 | 5/1986 | Hehn . |
| 4,616,861 | 10/1986 | Kurosaki ............................. 292/6 |
| 4,670,950 | 6/1987 | Wisecup et al. ............... 70/57.1 |
| 4,682,688 | 7/1987 | Budert ............................. 206/1.5 |
| 4,716,745 | 1/1988 | Hehn . |
| 4,804,082 | 2/1989 | Stein ............................. 206/1.5 |
| 4,834,238 | 5/1989 | Hehn et al. . |
| 4,871,065 | 10/1989 | Hehn et al. . |
| 4,966,020 | 10/1990 | Fotheringham et al. . |
| 4,972,690 | 11/1990 | O'Sullivan . |
| 5,039,982 | 8/1991 | Brühwiler . |
| 5,050,762 | 9/1991 | Giorgi ............................. 292/80 X |
| 5,129,244 | 7/1992 | Wittman . |

*Primary Examiner*—Jacob K. Ackun, Jr.
*Attorney, Agent, or Firm*—Haugen and Nikolai

[57] ABSTRACT

A hard clear hangable package, locking cover and key for use in retail merchandising of video games and the like to further reduce the amount of business losses attributable to theft. The device includes a locking cover with an outer lip that prevents opening of the container without the precise key. It also includes a clamping member attached to a key base that automatically rotates into engaging position allowing the box to be removed from the locking cover, permitting the contents of the security box to be removed. The device firmly contains video games or the like.

16 Claims, 13 Drawing Sheets

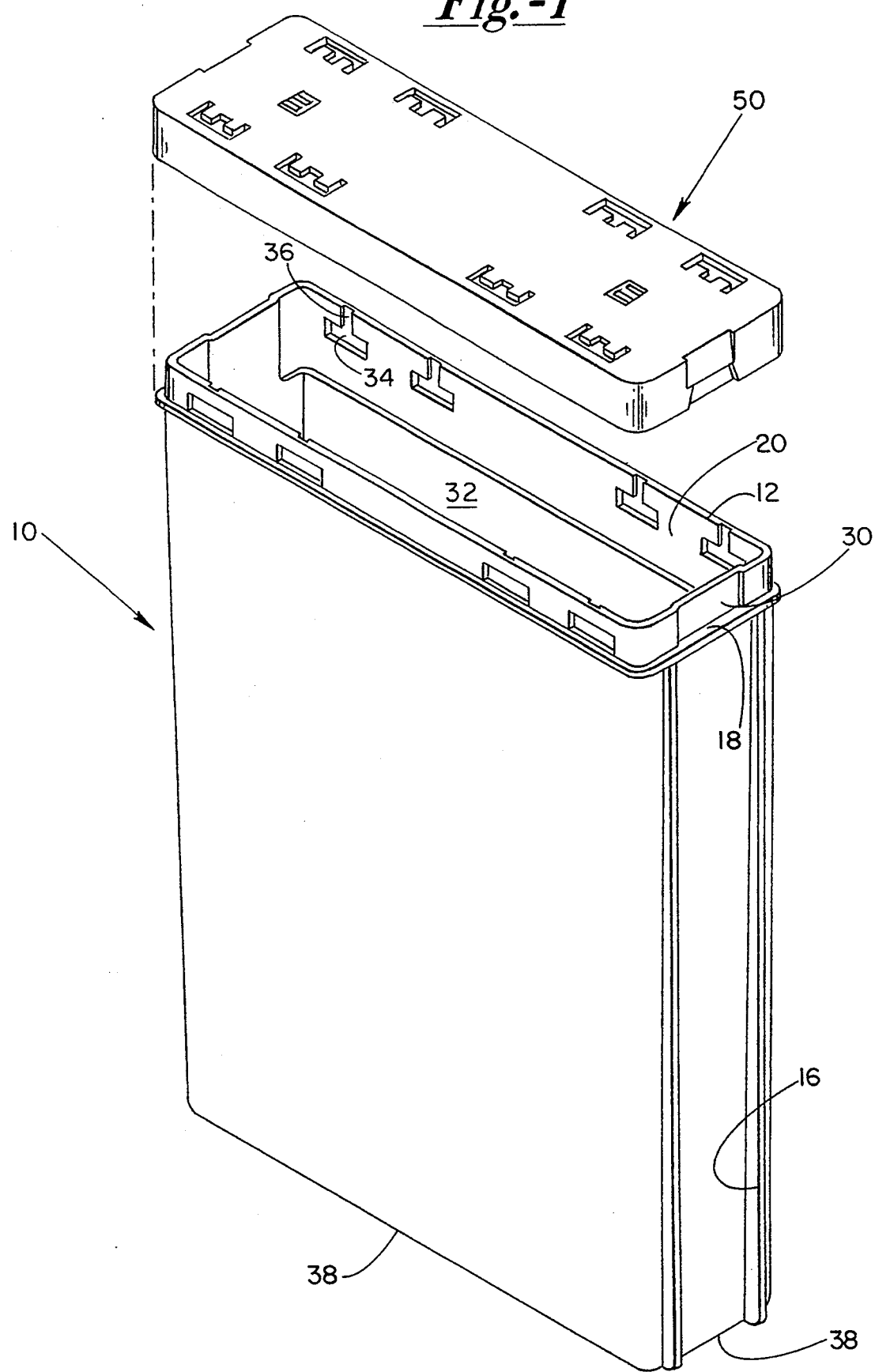

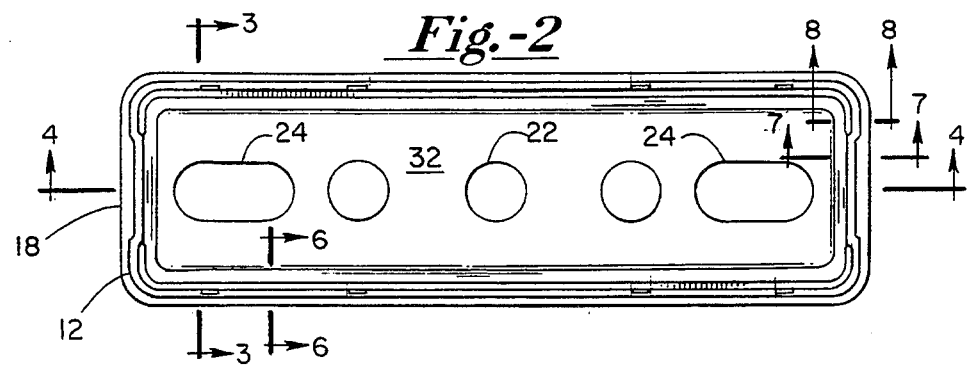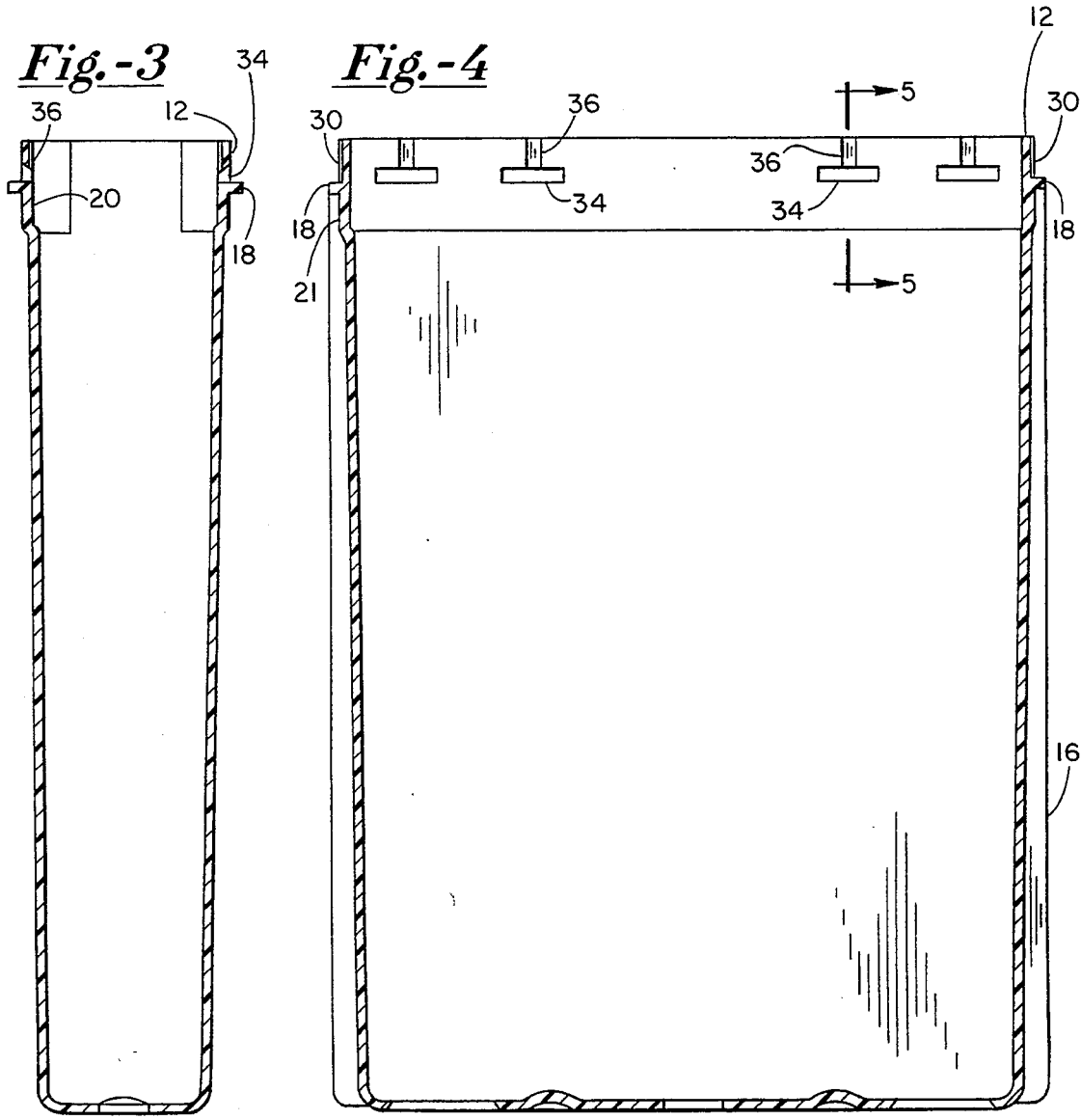

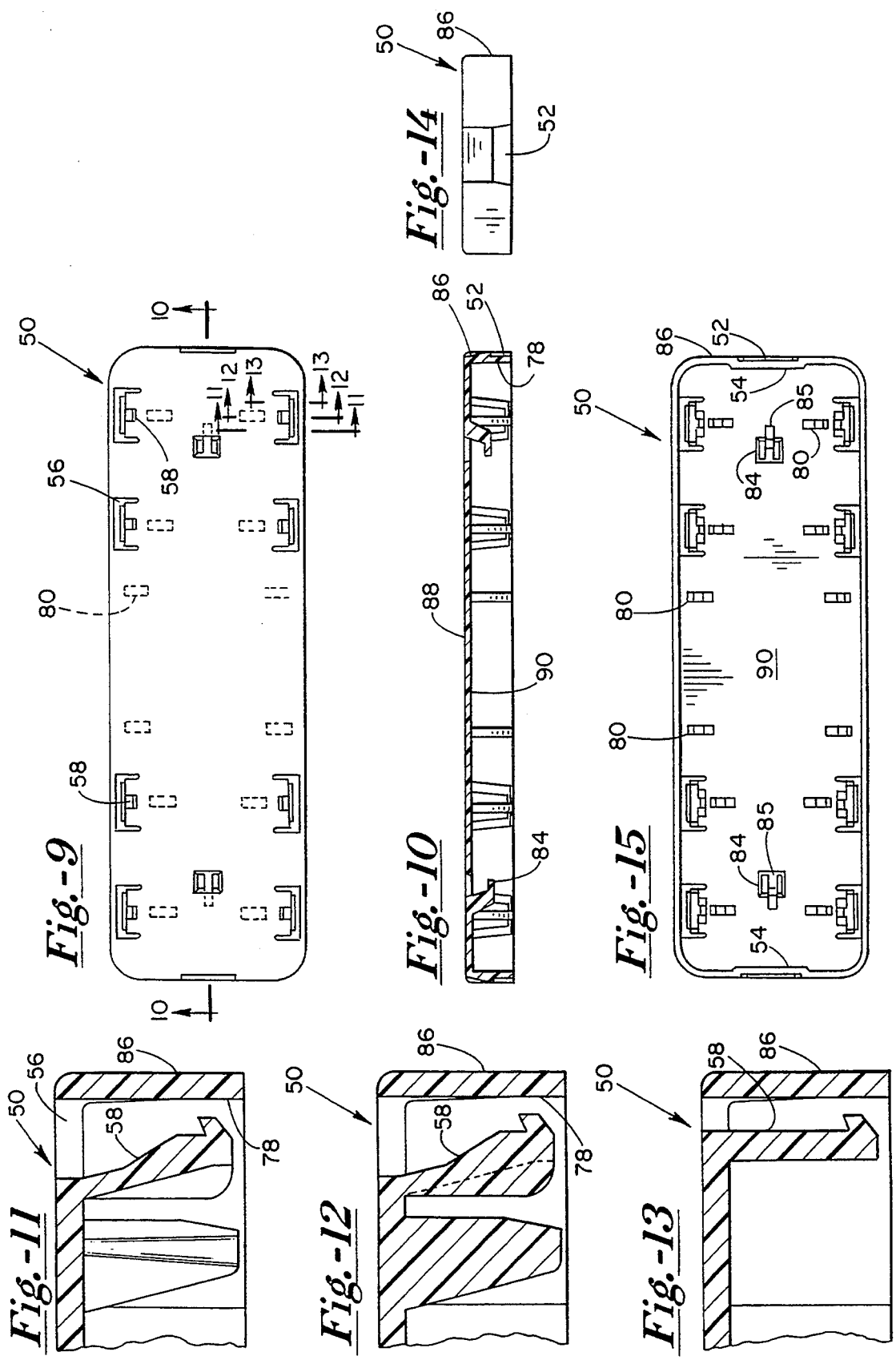

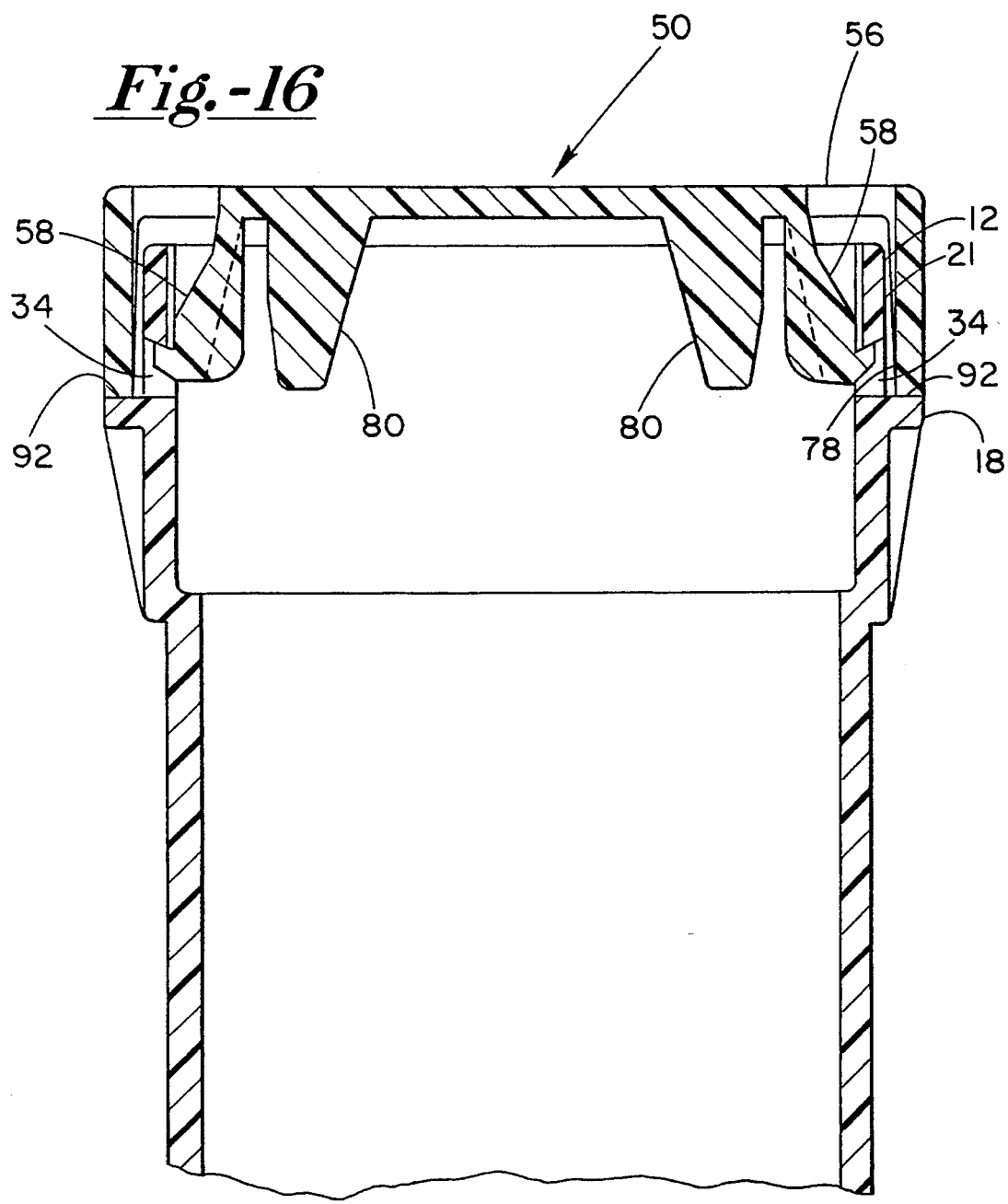

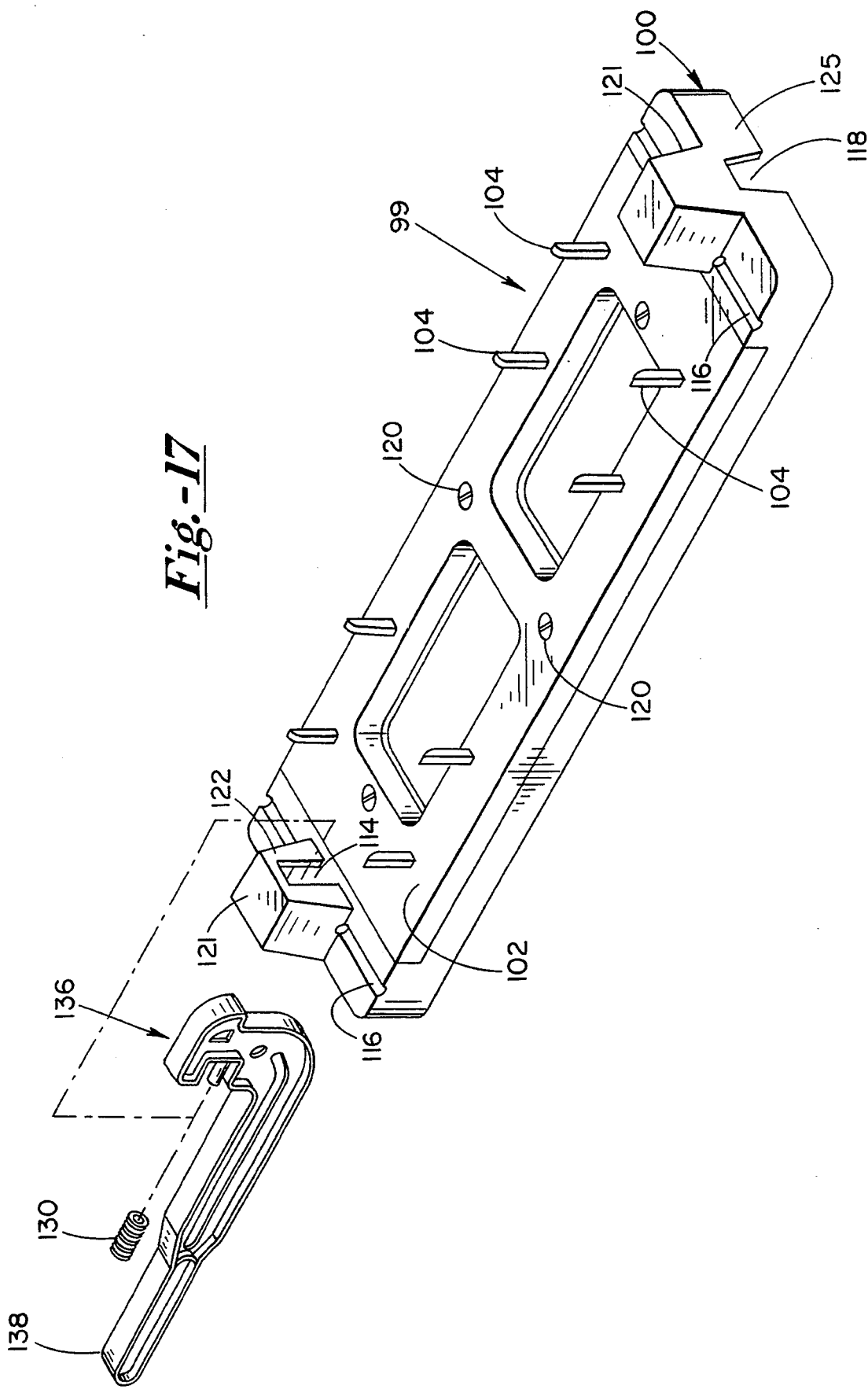

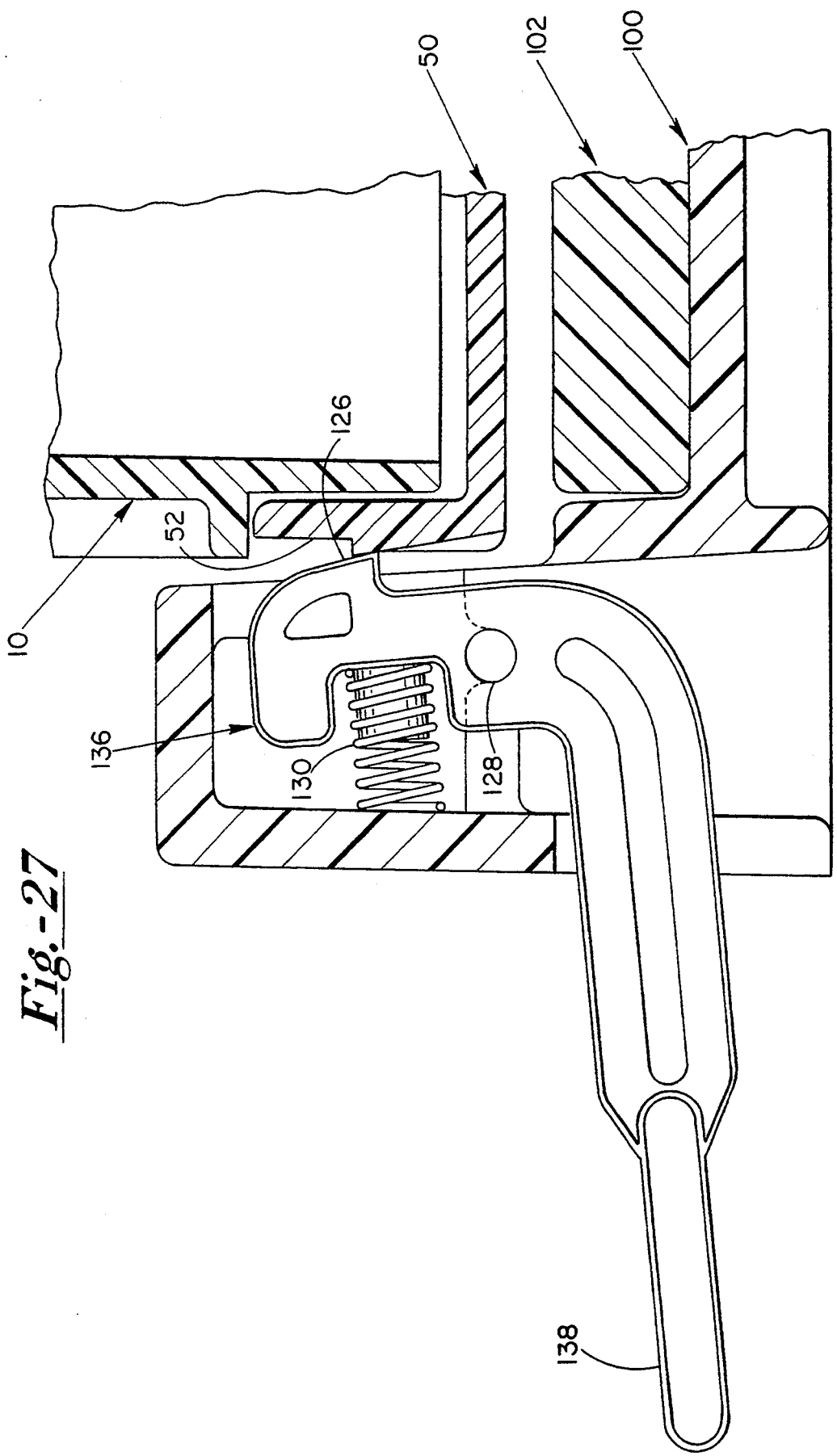

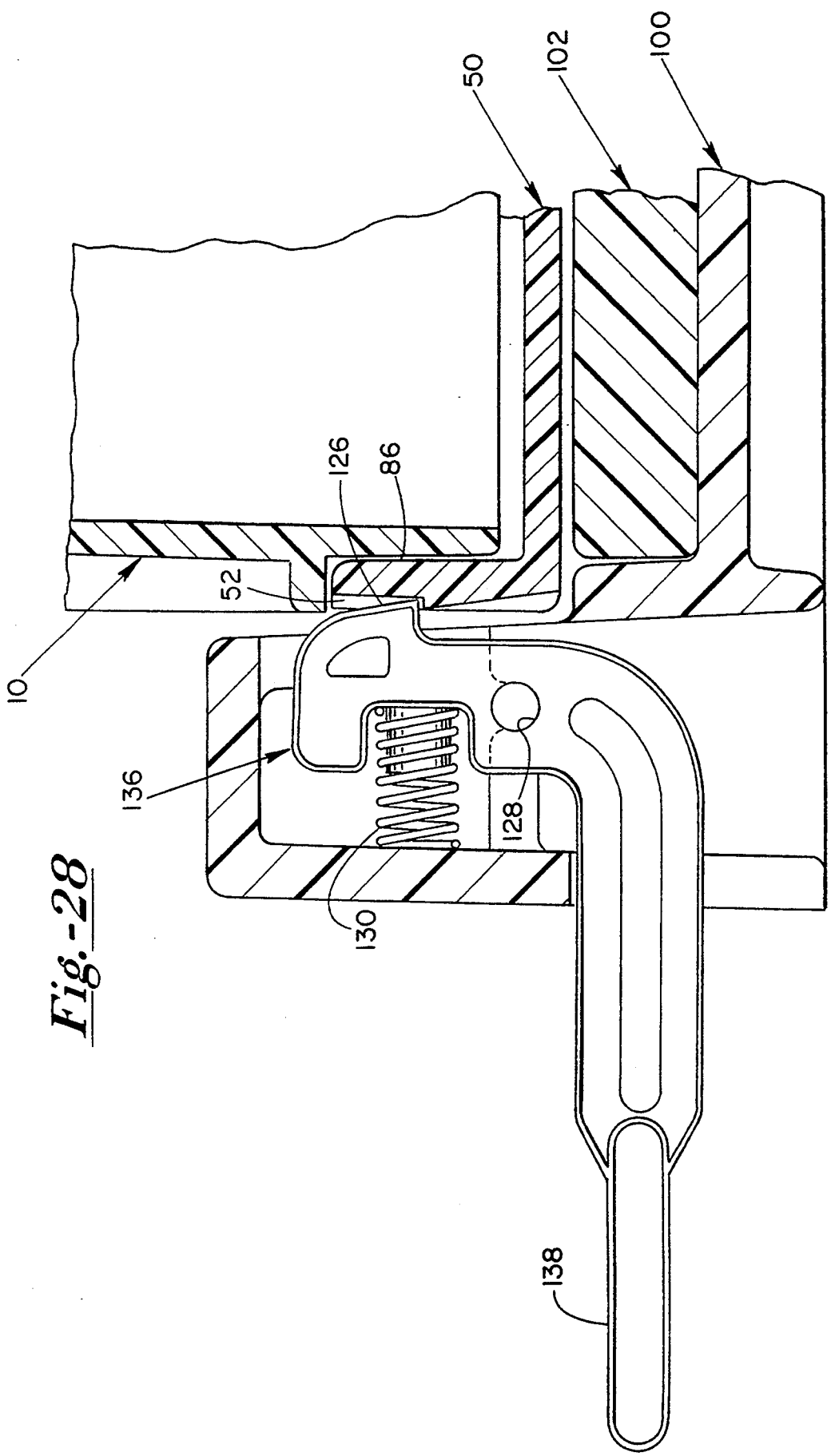

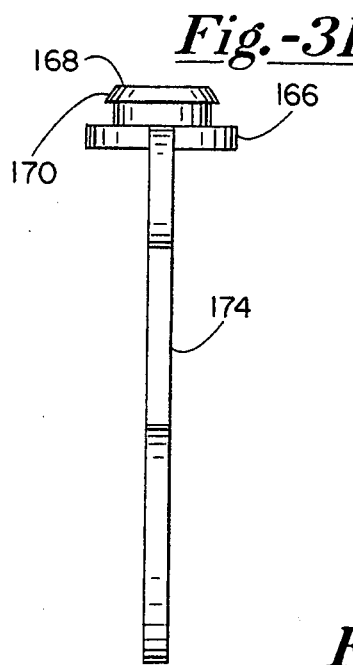
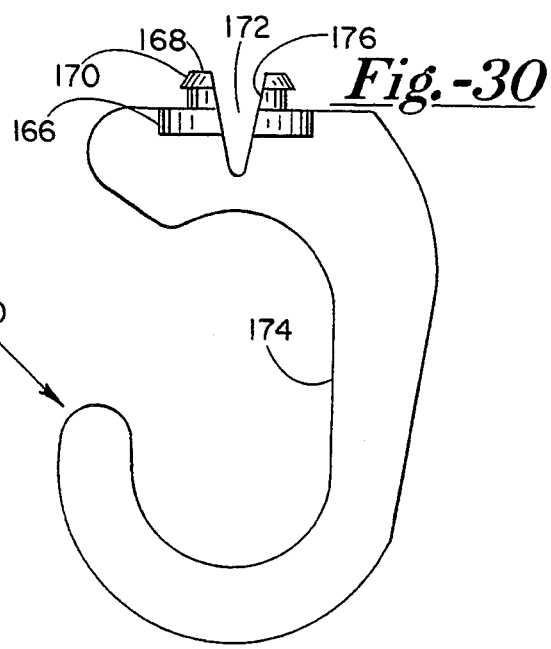
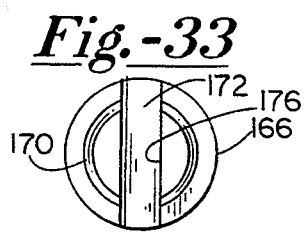
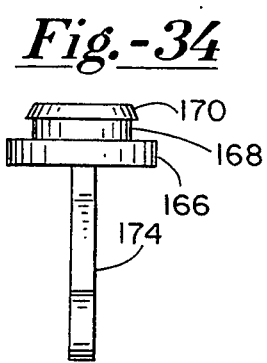
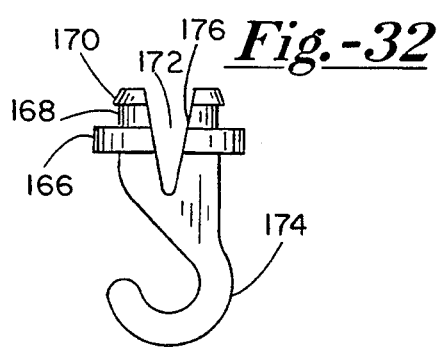
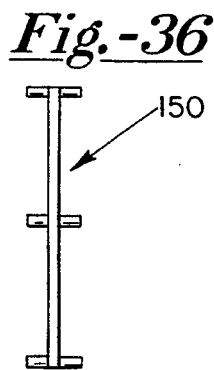
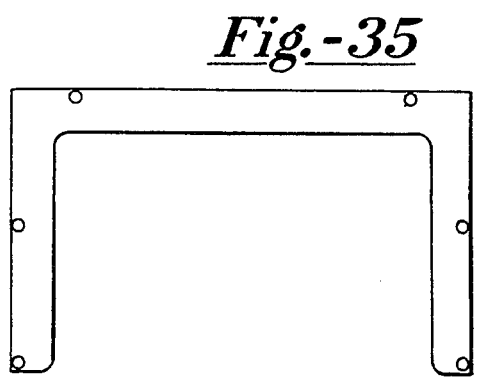
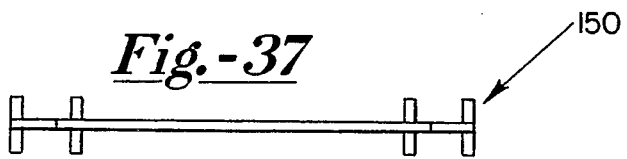

REUSABLE HARD CLEAR PACKAGE FOR VIDEO GAMES

BACKGROUND OF THE INVENTION

I. Field of the Invention

This invention relates generally to a security package for video games or the like. More particularly, it relates to a reusable hangable hard clear package that firmly contains videos with a locking arrangement to completely enclose a video game which prevents removal of the video game from the package without the use of the disclosed precise key means.

II. Discussion of the Prior Art

Throughout the years, theft has contributed to merchants' large business losses. Various devices and methods have been used in an attempt to deter theft thereby reducing these losses. Merchants dealing in video games, cassettes and the like continue to encounter a need to secure small and relatively expensive products in novel secure packaging to prevent theft.

In the past, anti-theft packages have had a hinged lid and a locking mechanism or a simple locking mechanism that is easily overcome by the thief. Magnetic strips of various forms have also been applied to the products' packaging. Although merchants presently have anti-theft packaging devices, there is a continued need for a more advanced locking means to prevent the creative opportunist from removing the product from the security device and exiting the retail store without purchasing the merchandise.

Previous anti-theft locking devices have been overcome by using paper clips, credit cards, razor blades, teeth, magnets or various other small concealable objects. Magnetic strips are easily avoided as a theft preventative without detection by removing or damaging the strip, removing the product from its package, circumventing the sensing field, or deactivating the sensing strip. Further, magnetic strips are not cost effective because at the point of sale, magnetic strips are deactivated but are not removed for later use. Another disadvantage of the present anti-theft locking devices is that keys presently in use do not aid in the removal of the locking device from the container. The present invention overcomes these disadvantages by providing a relatively inexpensive reusable hard clear container with a locking device that can be used in conjunction with the merchandiser's present electronic anti-theft alarm activators. It also has a more advanced precise locking means which cannot be easily overcome without the precise key means. The locking device is also held in place by the key means while the container is removed from the locking device.

SUMMARY OF THE INVENTION

It is accordingly a principal object of the present invention to provide an improved reusable anti-theft package.

Another object of the invention is to provide a reusable lockable package that can be displayed or hung in an aesthetically pleasing arrangement without compromising the degree of theft prevention.

Another object of the invention is to provide a lockable container that cannot be overcome without the use of a precise key.

Still another object of the invention is to provide a reusable relatively inexpensive lockable package that can be used in conjunction with retailers' present electronic anti-theft alarm activators.

A further object of the invention is to provide a device that holds the locking cover as the box is removed.

Yet another object of the invention is to provide a device with a more advanced locking means that is simple, quick and convenient for authorized personnel to use.

Another object of the invention is to provide a lockable package that can be adjusted to firmly contain video games of varying sizes.

In accordance with the present invention, the foregoing objects and advantages are achieved by providing a hard clear plastic box with an open end, a locking cover, an adjusting brace, a hook, and a key mechanism. The opening of the box has a lip with guide channels which retain and index the locking cover in proper position when being pressed on. The bottom of the box has an aperture that allows a hook to be snapped into position, providing a means to aesthetically display the box on display racks. The box lip also has a plurality of slots which accept the locking cover's projections in a mating relationship. The locking cover has a plurality of keyholes, a plurality of projections, and a lip that encompasses the box lip, completely enclosing the slots in the box lip. The locking cover also has tabs that securely hold an insert that interacts with retailers' present electronic anti-theft alarm activators. The tab also securely holds an adjusting brace, used to firmly contain various sized video games within the box. The keying mechanism includes key pegs that disengage the lock cover's projections. The key base also has clamping members that automatically holds, the lock cover while the box is removed and rotate away from the lock cover to allow the lock cover and key base to be separated.

When used, a video game or the like is placed inside the hard clear plastic box through the open end. The locking cover is then pressed onto the open end of the box. The locking cover projections engage into the box lip slots, locking the cover in place. On the inside of the locking cover is a tab for holding an insert that interacts with the retail store's electronic anti-theft alarm activators, further deterring removal of the security package from the store. The adjusting brace may be engaged with the tab to reduce movement of smaller video games within the box.

Authorized personnel may remove the locking cover simply and efficiently by aligning the key base and the locking cover and pressing the two together. The key pegs disengage the locking projections, moving the locking projections out of mated relation with the box lip slots, allowing the box to be removed. When the key base is pressed against the locking cover, the key base clamping members automatically rotate into position, holding the lid in place while the box is removed. The clamping members are then rotated away from the locking cover to allow removal of the locking cover from the key base. A hook of various shapes may be snapped onto the bottom of the box, allowing the box to be hung on a display bar in an aesthetically pleasing fashion.

The foregoing features and advantages of the present invention will be readily apparent to those skilled in the art from a review of the following detailed description of the preferred embodiment in conjunction with the accompanying drawings and claims.

DESCRIPTION OF THE DRAWINGS

FIG. 1 is a perspective view of the anti-theft box, and locking cover, of the present invention.

FIG. 2 is a plan view of the box, of the type shown in FIG. 1.

FIG. 3 is a partial cross-sectional view through line 3—3 of FIG. 2.

FIG. 4 is a partial cross-sectional view through line 4—4, of FIG. 2.

FIG. 9 is a partial plan view of the locking cover of the type shown in FIG. 1.

FIG. 10 is a partial cross-sectional view through line 10—10 of FIG. 9.

FIG. 11 is a partial cross-sectional view through line 11—11, broken away, of FIG. 9.

FIG. 12 is a partial cross-sectional view through line 12—12, broken away, of FIG. 9.

FIG. 13 is a partial cross-sectional view through line 13—13, broken away, of FIG. 9.

FIG. 14 is an elevational end view of the locking cover shown in FIG. 9.

FIG. 15 is a bottom view of the locking cover shown in FIG. 9.

FIG. 16 is a partial sectional end view of an engaged box and locking cover, of the type shown in FIG. 1.

FIG. 17 is a perspective view of the key mechanism with the clamping member removed but aligned with the base and with the key insert attached to the key base.

FIG. 27 is a partial sectional side elevational view, broken away, of the engaged locking cover and box with the key mechanism partially inserted.

FIG. 28 is a partial sectional side elevational view, broken away, of the engaged locking cover and box with the key mechanism inserted showing the clamping member engaged with the locking cover.

FIG. 30 is a side elevational view of a hook that is engaged with the box bottom of the type shown in FIG. 2.

FIG. 31 is an end elevational view of the hook of the type shown in FIG. 30.

FIG. 32 is a side elevational view of the alternate preferred embodiment of the hook of the type shown in FIG. 30.

FIG. 33 is a plan view of the hook of the type shown in FIG. 32.

FIG. 34 is an end elevational view of the hook of the type shown in FIG. 32.

FIG. 35 is a plan view of the brace that is engaged with the locking cover of the type shown in FIG. 9.

FIG. 36 is an end elevational view of the brace of the type shown in FIG. 35.

FIG. 37 is a side elevational view of the brace of the type shown in FIG. 35.

DETAILED DESCRIPTION OF THE PREFERRED EMBODIMENT

Figure 7:
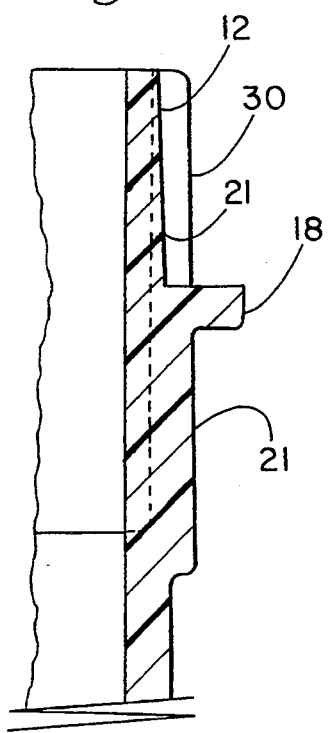
FIG. 7 is a partial cross-sectional view through line 7—7, broken away, of FIG. 2.
Figure 8:
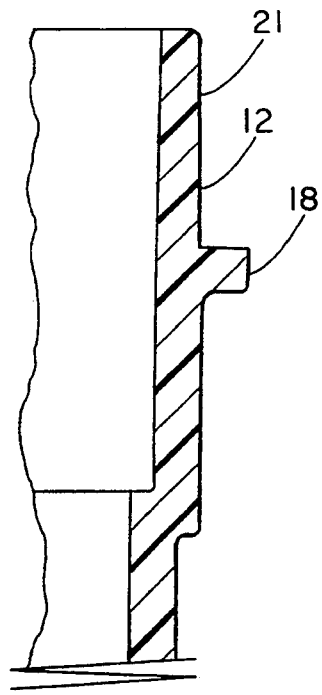
FIG. 8 is a partial cross-sectional view through line 8—8, broken away, of FIG. 2.

Referring first to FIG. 1, there is indicated generally the rectangular box 10, and the locking cover 50. The rectangular box 10 has an open end 32 where the video game or the like is placed inside. The open end is formed by box lip 12 and bottom engaging edge 18 which engages with the locking cover 50 (See FIGS. 1 and 2). Extending on either end of the box 10 are ribs 16 which extend along the length of the box providing support and rigidity (See FIGS. 1 & 4). Recessed in the box lips outside surface 21 on the end of box lip 12 perpendicular to bottom engaging edge 18 are first guide channels 30 which locate and guide the locking cover, ensuring that even force is applied to each locking projection 58 (See FIGS. 4 and 7).

Figure 5:
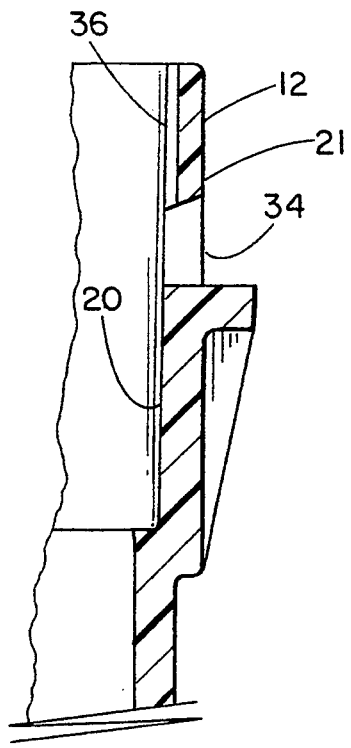
FIG. 5 is a partial cross-sectional view through line 5—5, broken away, of FIG. 4.
Figure 6:
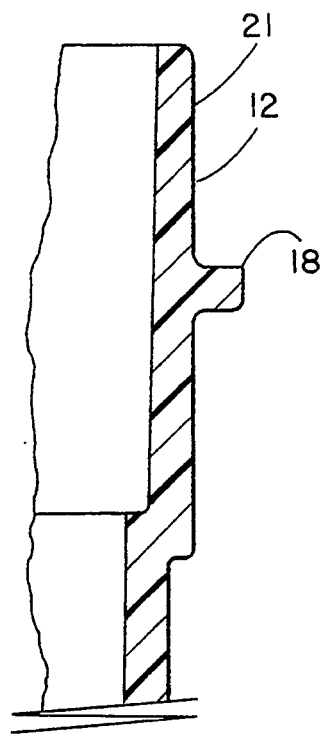
FIG. 6 is a partial cross-sectional view through line 6—6 broken away of FIG. 2.

A plurality of slots 34 are formed through the side of the lip 12 parallel to the bottom engaging edge 18 (See FIGS. 3, 4, and 5). These slots serve to receive and engage with the projections 58 on the locking cover 50 (See FIG. 16). Recessed in the box lip 12's inner surface 20 is a plurality of second guide channels 36 which are centered above each slot 34 and extend perpendicularly upward to the outer edge of the lip's inner surface 20 (See FIGS. 1, 3, 4 and 5). The second guide channels 36 serve to index and retain the key pegs 104.

The bottom of box 38 has an aperture 22 which is centered in the box bottom 38. The bottom of box 38 also has a plurality of elongated apertures 24 symmetrically positioned an equal distance away from the center of the box (see FIGS. 1 & 2). A hook 160 (see FIG. 30-34) may be aligned and snapped into the aperture 22. The elongated aperture 24 provides a second means to remove objects placed within box 10, the first means being a gravitational force provided by tipping the box, and the second means being projecting an object through aperture 24 and applying a force with the object against the video game.

In the preferred embodiment, the box is made of polycarbonate. Other suitable materials can, of course, be used without deviating from the invention.

The hook 160 shown in FIGS. 30 & 31 has a concentric base 166 and a curved member 174 extending perpendicularly from the center of the base. A plurality of arcuate, resilient fingers 168 extend perpendicularly from the center of the base 166 in a direction opposite the curved member 174. In the preferred embodiment, two arcuate, resilient fingers 168 with a tapered back 176 form a semicircle and are aligned and offset opposite each other such that a tapered slot 172 is formed therebetween. The diameter formed by the two arcuate fingers 168 is slightly less than the box bottom aperture 22. The tapered slot 172 extends into the base 166 and curved member 174 providing further relief and resilience to the fingers 168. Extending perpendicularly outward from the end of the outer arcuate surface of the fingers are arcuate barbs 170. When the fingers 168 are aligned and engaged with the box bottom aperture 22, the fingers 168 bend inward, allowing the barbs 170 to be pushed through the aperture 22. When the barbs 170 pass completely through the box bottom aperture 22, the fingers 168 bend back to their original position. The barbs 170 engage with the inside of box bottom 38, holding the hook 160 in place and preventing the hook 160's removal. The curved member 174 extending from the center of the base 166 may be of varying sizes and shapes. An alternative preferred embodiment is shown in FIG. 32, 33, and 34. The alternate preferred embodiment has an alternate varying size and shape of the curved member 174.

Figure 29:
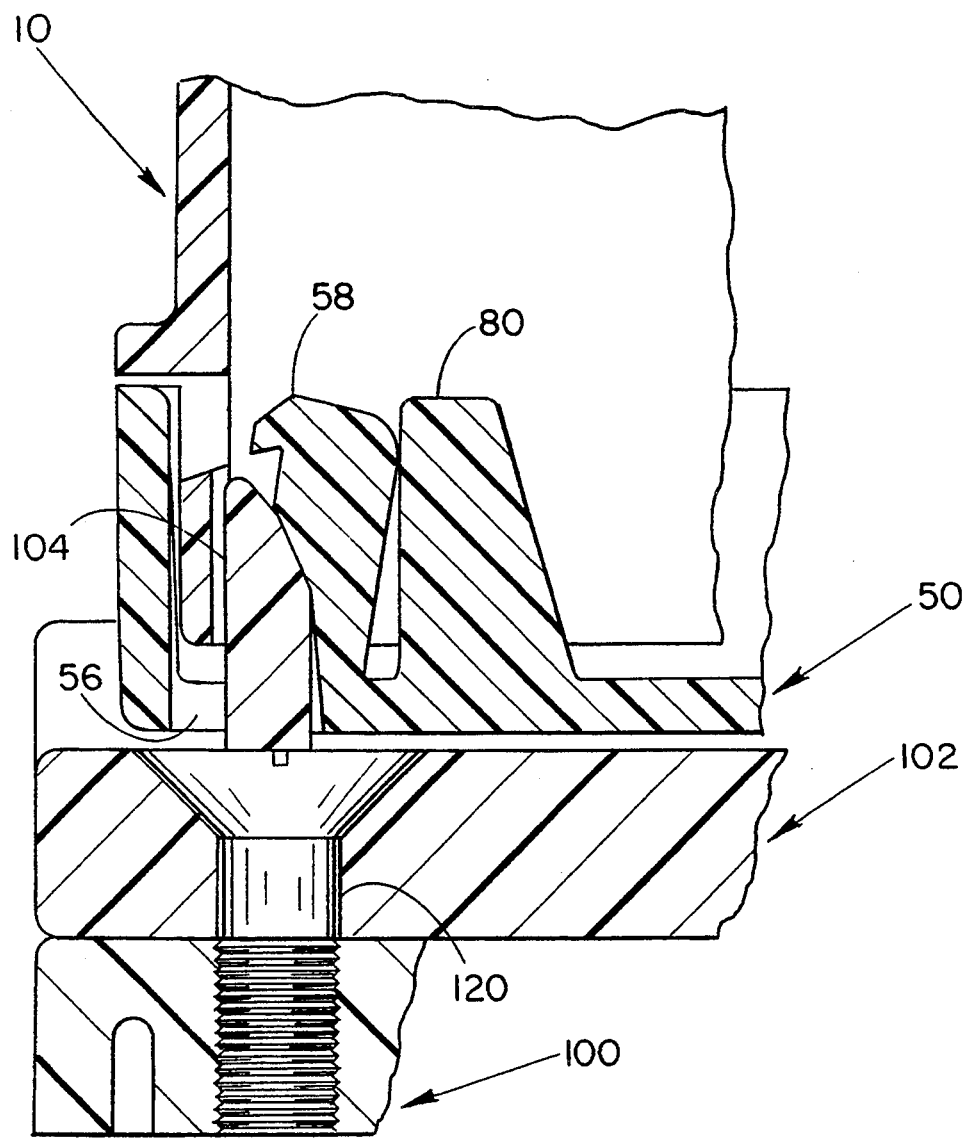
FIG. 29 is a partial sectional end view, broken away, of the engaged locking cover, box and key mechanism showing key pegs disengaging the locking cover projections from the box slot.

The locking cover mechanism 50 shown in FIG. 9 has a plurality of locking projections 58 having a fixed end extending perpendicularly away from the lock cover (See FIGS. 11, 12, and 13). A lip 86 extending perpendicularly around the perimeter of locking cover 50 has an inside surface 78 which slidably engages with the outside surface of the box lip 21 (See FIGS. 12 and 16). A notch 52 is formed on each end of the cover's lip 86 to receive a clamping member 136 (See FIGS. 10, 14, 15, 27, and 28). A shoulder 54 extends inward on each end of the cover's lip (See FIG. 15) to slide along the first guide channel 30 indexing and retaining the locking cover 50. A precise keyhole 56 extends through the locking cover 50 positioned above the vertical center line of the locking projection 58 (See FIGS. 9, 11, and 16). The locking cover 50 also has a plurality of ejector pin bosses 80 that provide support to the locking cover during the molding process and further aligns the locking cover 50 with the box lip 12. (see FIG. 15, 16, and 29)

The inside locking cover surface 90 has two tab means 84 extending perpendicularly outward from it. The tab means 84 are arranged on the inside lock cover surface 90 to accept and hold an insert that interacts with store's electronic anti-theft alarm activators (See FIGS. 10 & 15). Each tab 84 has a slot 85 which is designed to accept and hold a brace 150. The adjusting brace 150 has a thickness about equal to the slot 85's width, allowing the brace 150 to be firmly pressed into position (see FIGS. 35–37). The adjusting brace 150 may be made of varying heights so that when engaged with the tabs 84, the brace 150 firmly contains various sized video games or the like within the box. The locking cover lip bottom edge 92 engages against the box lip's bottom engaging edge 18 when the lock cover 50 is pressed onto the box lip 12 (See FIG. 16).

In the preferred embodiment, the locking cover is made of polycarbonate. Other suitable materials can, of course, be used without deviating from the invention.

Figure 18:
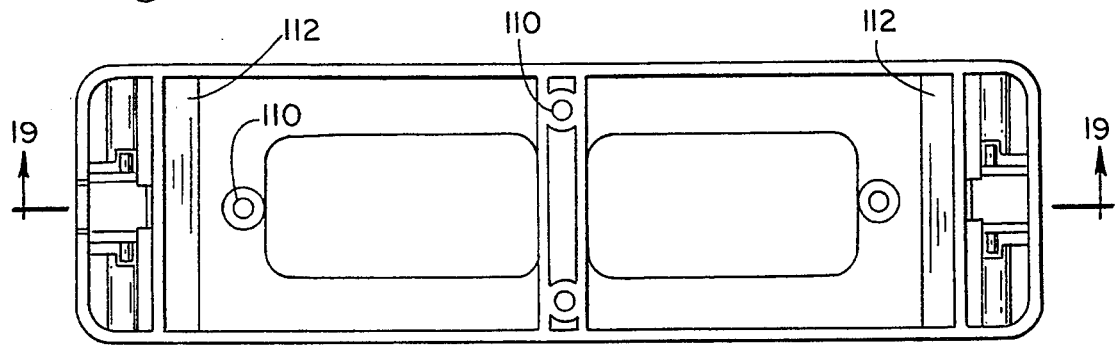
FIG. 18 is a bottom view of the key base of the type shown in FIG. 17.
Figure 19:
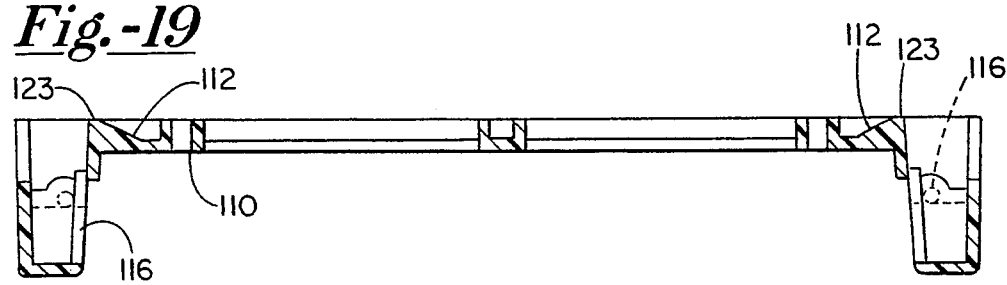
FIG. 19 is a partial sectional side elevational view of the key base of the type shown in FIG. 17.
Figure 20:
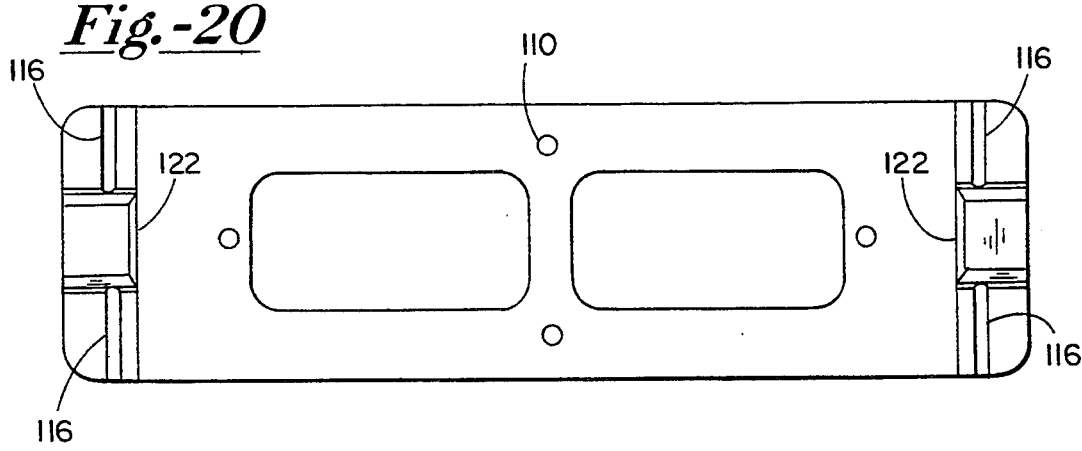
FIG. 20 is a plan view of the key base of the type shown in FIG. 17.
Figure 21:
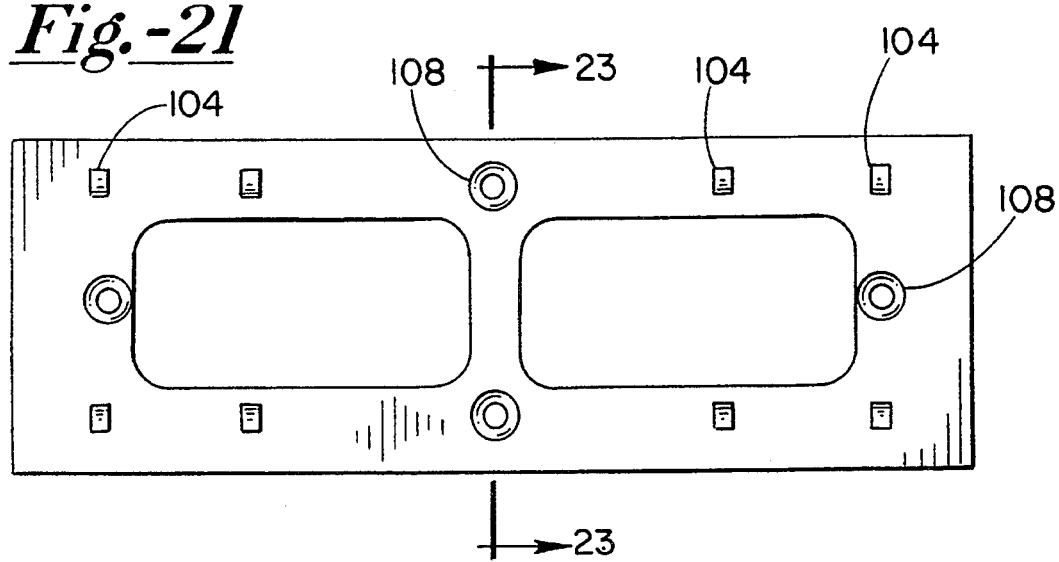
FIG. 21 is a plan view of the key insert of the type shown in FIG. 17.
Figure 22:
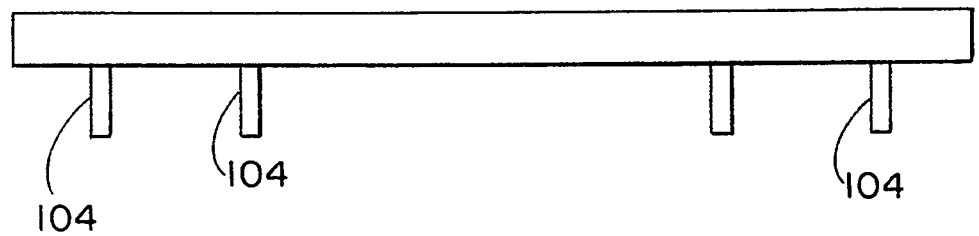
FIG. 22 is side elevational view of the key insert of the type shown in FIG. 17.
Figure 23:
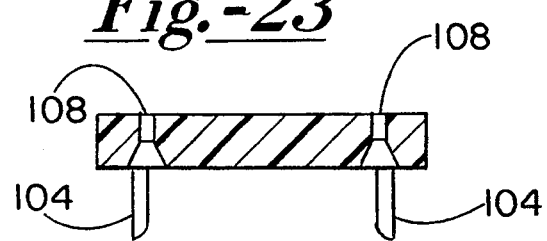
FIG. 23 is a partial sectional end view of the key insert of the type shown in FIG. 17.
Figure 26:
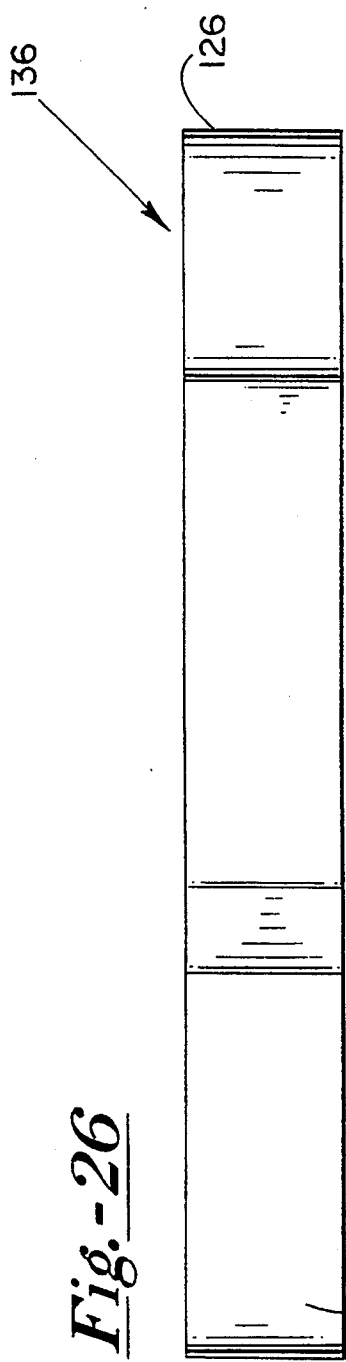
FIG. 26 is a plan view of the clamping member of the type shown in FIG. 17.

The key mechanism 99 shown in FIG. 17 has a key base 100, a key insert 102 and a clamping member 136. The key base 100 has a key insert 102 (see FIGS. 17 & 29) secured with a plurality of flat head screws 120 that self-tap through a plurality of key insert bores 108 and through a plurality of key base bores 110, aligning the key insert 102 with the key base 100. (see FIGS. 17, 20, and 21) The bottom of key base 124 has a rib 112 angularly extending to the key bottom inner side 123 to provide rigidity and support. (see FIGS. 18 & 19) The key base 100 has sides 121 extending perpendicular to the key base 100 whose inner side 122 are slightly greater than the locking cover lip 86.

The key insert 102 has a plurality of key pegs 104 which mate with the locking cover keyholes 56 in the locking cover 50. In the preferred embodiment, the key pegs 104 have sloping angles that help reduce friction between the key pegs 104 and the locking cover projections 58 when the key pegs 104 are pressed into the locking cover keyholes 56. Also in the preferred embodiment, the key insert is made of aluminum. Other suitable materials can, of course, be used without deviating from the invention. (see FIGS. 21, 22, 23, and 29)

The key base sides 121 have slots 114 on the inside surface of key base 122 for clamping members 136 to rotate through the base side. Slots 118 on the outside of the key base sides 125 allow the clamping member release end 138 to rotate through the key base side 121. A key base bore 116 extends through the key base sides perpendicular to the slots 118 and 114 that accepts a rotation pin 134 that creates a rotation access for the clamping member 136. (see FIGS. 17, 18, and 19)

Figure 24:
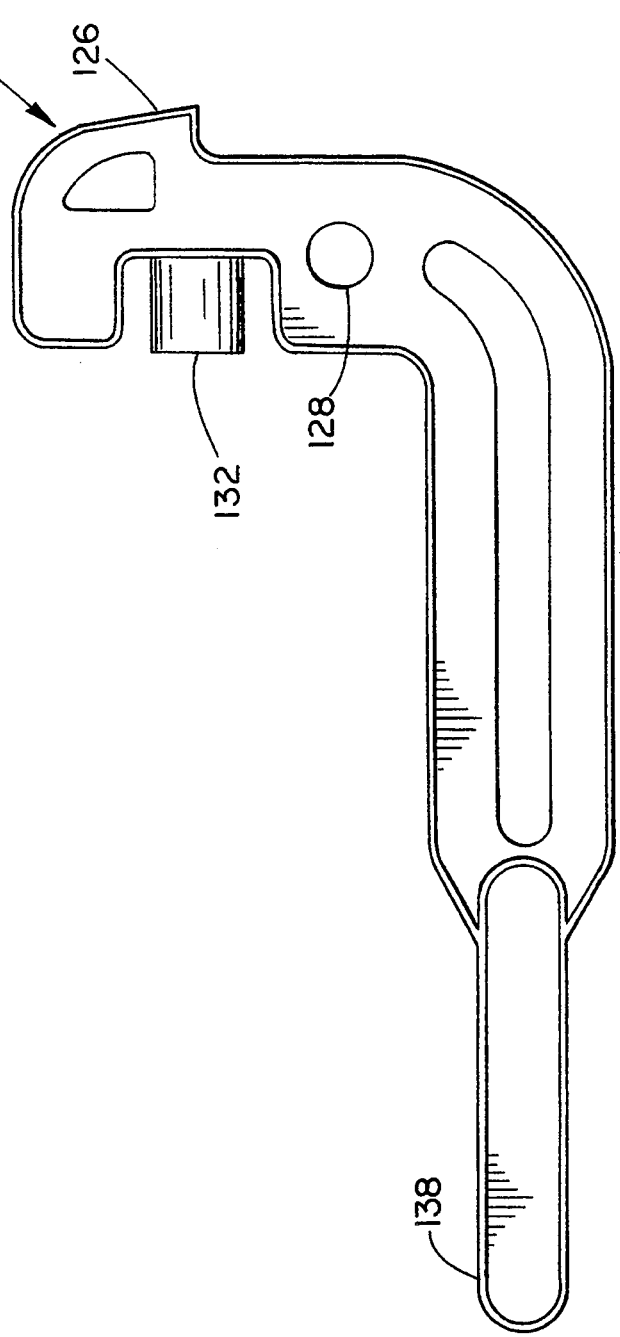
FIG. 24 is a side elevational view of the clamping member of the type shown in FIG. 17.
Figure 25:
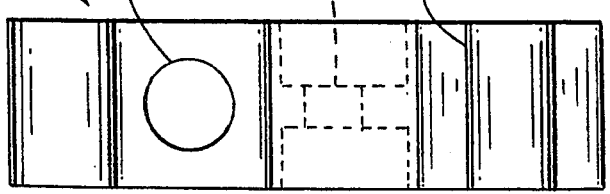
FIG. 25 is a partial end view of the clamping member of the type shown in FIG. 24.

The clamping member 136 has a bore 128 that aligns with the key base bore 116 allowing the rotation pin 134 to be positioned through both bores. The clamping member 136 also has a clamping member flange 126. The clamping member flange 126 extends from the clamping member and mates with the locking cover receiving notch 52 when the key base 100 is positioned properly against the lock cover 50. (see FIGS. 24, 27, and 28) On the side of the clamping member 136 opposite the clamping member flange 126 is a clamping member spring support pillar 132, extending perpendicularly from the clamping member side in the opposite direction from the clamping flange 126. (see FIGS. 24 and 25) A spring 130 with an inner diameter slightly greater than the outside diameter of the spring support pillar 132 is positioned with the spring support pillar 132 extending partially through the spring 130, retaining the spring 130. (see FIGS. 17, 27, and 28)

With the key base 100 properly aligned and pressed onto the locking cover 50, the clamping member spring 130 provides a force against the clamping member 136, automatically rotating the clamping member 136, and engaging the clamping member flange 126 with the locking cover receiving notch 52. The clamping member 136 also has a clamping member release end 138. A force against the clamping member release ends 138, in a direction opposite the locking cover, compresses the clamping member spring 130, causing the clamping members 136 to rotate away from the locking cover 50, releasing the clamping member flange 126 from the locking cover receiving notches 52. (see FIGS. 27 and 28) In the preferred embodiment, the clamping member is made of LexonR-glass filled. Other suitable materials can, of course, be used without deviating from the invention.

operation of the present invention will now be discussed. The operator places a video game through the open end 32 of the box 10 until the game is completely through the open end of the box. The operator then aligns the locking cover shoulder 54 with the box's guide channel 30. When the locking cover shoulder and guide channel are aligned, the operator applies a force against the to locking cover perpendicular to the outside locking cover surface 88 engaging the bottom engaging edge 18 to the locking cover lip bottom edge 92. The locking cover projections 58 mate with the box slots 34, locking the cover to the box. (see FIG. 16)

To remove the locking cover 50 from the box 10, the key base 100 is aligned with the locking cover so that the clamping member flanges 126 are aligned with the locking cover receiving notches 52. The operator then presses the key base 100 and the box 10 together. The plurality of pegs 104 enter through the plurality of keyholes 56 disengaging the locking cover projections 58 from the slots 34. (see FIG. 29) The clamping member flange 126 automatically engages with the locking cover receiving notches 52 allowing the operator to remove the box from the locking cover while the locking cover remains engaged with the key base 100. (see FIG. 28)

To remove the locking cover from the key base, the operator applies a force to the clamping member release ends 138 in a direction opposite the locking cover 50. The force rotates the clamping member flanges 126 away from the locking cover receiving notch 52 allowing the locking cover 50 and key base 100 to be pulled apart.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A security system for securely containing video games or the like comprising:
   (a) a box, including an open end, a lip forming the open end, and a plurality of engaging slots in said lip;
   (b) a locking cover designed to engage the box, said locking cover including a base, a plurality of locking means projecting away from the base for mating with the engaging slots of the box, key hole means for allowing a key to be inserted for disengaging the said locking means from said engaging slots, and a lip extending around the perimeter of the base in the same direction and substantially parallel to the locking means for covering said engaging slots when the locking cover engages the box; and
   (c) a key means including a base, and a plurality of key pegs projecting from the base and aligned to enter the key hole means of the locking cover to move the locking means out of mating relationship with said engaging slots.

2. A device as recited in claim 1 further comprising an insert on the interior of the box and locking cover when the locking cover engages the box that interacts with the store's anti-theft alarm activators.

3. A device as recited in claim 1 in which said box further comprises a guide means in said box lip to ensure an even force is applied to each said locking means.

4. A device as recited in claim 1 further comprising guide means in said box lip to index and retain said key pegs.

5. A device as recited in claim 1 in which said key means further comprises sides extending from the base in the same direction as said key pegs, where the inside dimension of said sides approximates the width of said locking cover.

6. A package for securely containing video games or the like comprising:
   (a) a box, including an open end, a lip forming the open end, and a plurality of engaging means;
   (b) a locking cover including a base, a plurality of locking means projecting outward from the base for mating with said engaging means, key hole means for permitting insertion of a key capable of disengaging the locking means, a covering lip extending perpendicularly around the perimeter of the base on the same side as said locking means where the inside width of said covering lip approximates the outside width of the said box lip and wherein said covering lip surrounds the lip of the box, covering the engaging means of the box when the box is locked; and
   (c) a key means including a base, sides, slots in the sides, a clamping means, a rotation bore in the sides perpendicular to the width access, and key pegs projecting from the base positioned to align with the key hole means and move the engaging means and locking means out of mating relation.

7. A device as recited in claim 6 further comprising a plurality of tab means extending from said cover to hold a metal insert and a brace, on the interior of the box and locking cover when the locking cover engages the box, whereby said insert interacts with a store's anti-theft alarm activators.

8. A device as recited in claim 6 in which said box further comprises a guide means in said box lip to ensure an even force is applied to each said locking means.

9. A device as recited in claim 6 further comprising guide means in said box lip to index and retain said key pegs.

10. A device as recited in claim 6 where said key means' inner width between the said sides approximates the outside width of said locking cover.

11. A device as recited in claim 6 where said locking cover further comprises a notch on each side of said lip designed to create a holding edge for said clamping means.

12. A device as recited in claim 6 where the clamping means further comprises:
   (a) a clamping member release means;
   (b) a clamping member flange to hold the said locking cover while said box is removed from said locking cover;
   (c) a bore creating a rotation access for said clamping member; and
   (d) a rotation pin journaled to align said bore with said sides rotation bore.

13. A device as recited in claim 12 further comprising a support pillar extending perpendicularly from the side of said clamping means in a direction substantially opposite the clamping member flange to retain a spring with an inner diameter slightly greater than the outside diameter of said support pillar, said spring is positioned with said support pillar partially extending through said spring thereby retaining said spring in proper position.

14. A device as recited in claim 6 where said box further comprises an aperture extending through the bottom.

15. A device as recited in claim 14 further comprising a means for hanging said package attached to said cover or box.

16. A device as recited in claim 15 in which said means for hanging said package further comprises a hook having a base and a curved member, with resilient fingers having an arcuate side and extending outward in a direction opposite said curved member therefrom, said fingers being concentrically spaced forming a hollow center section and opposing each other, wherein said fingers further comprise arcuate barbs extending outward from said arcuate side of said fingers such that when said fingers are aligned and engaged with said box bottom aperture, said barbs prevent removal of said hook from said box bottom aperture.

* * * * *